UNITED STATES PATENT OFFICE.

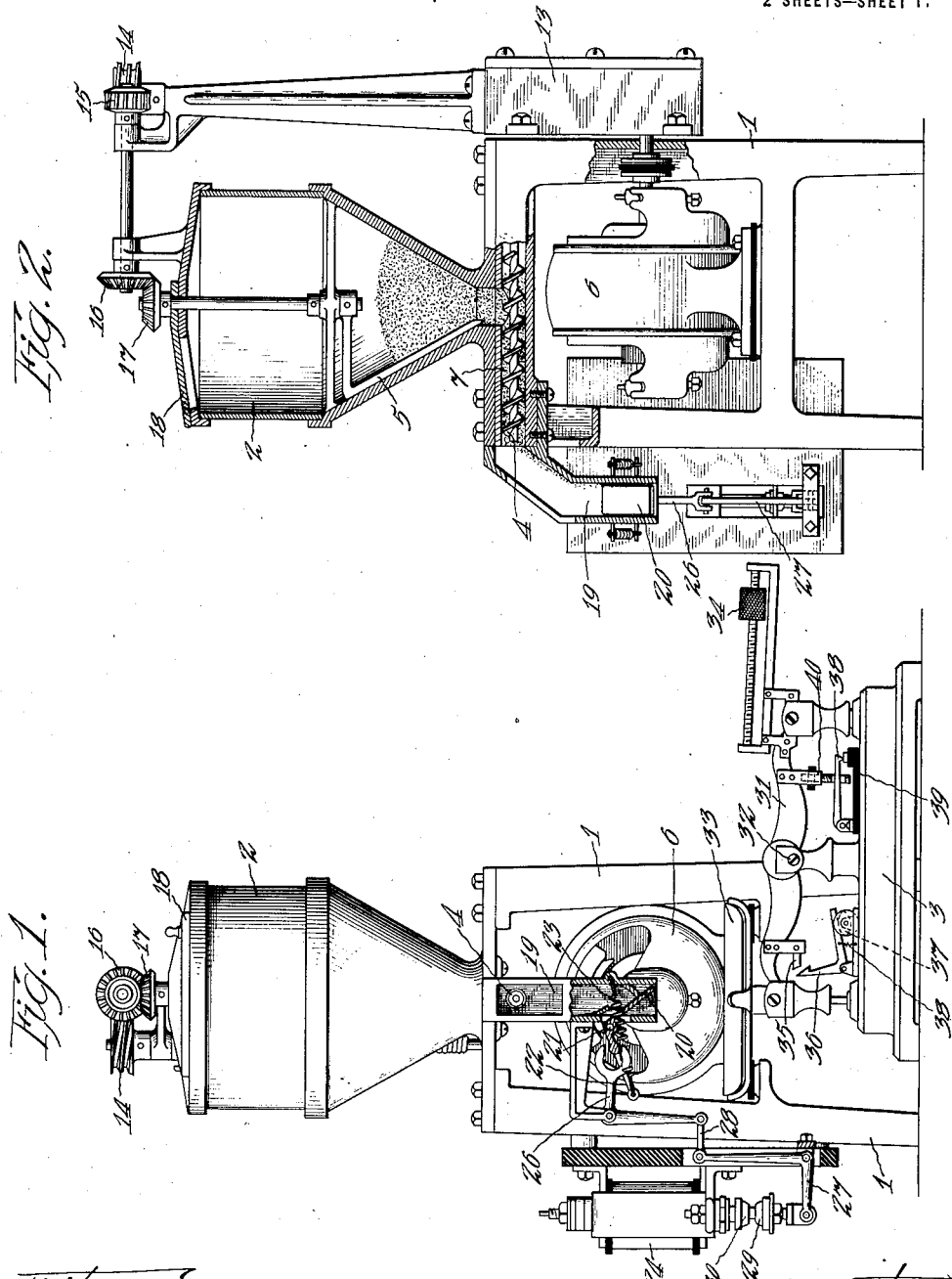

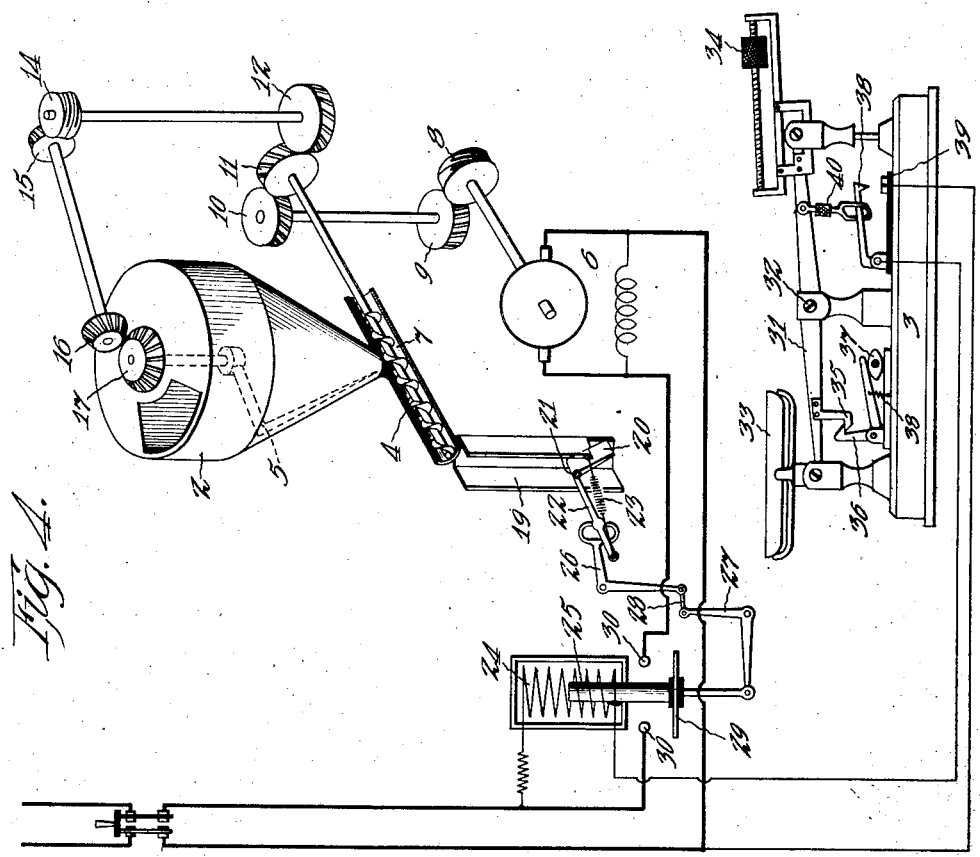
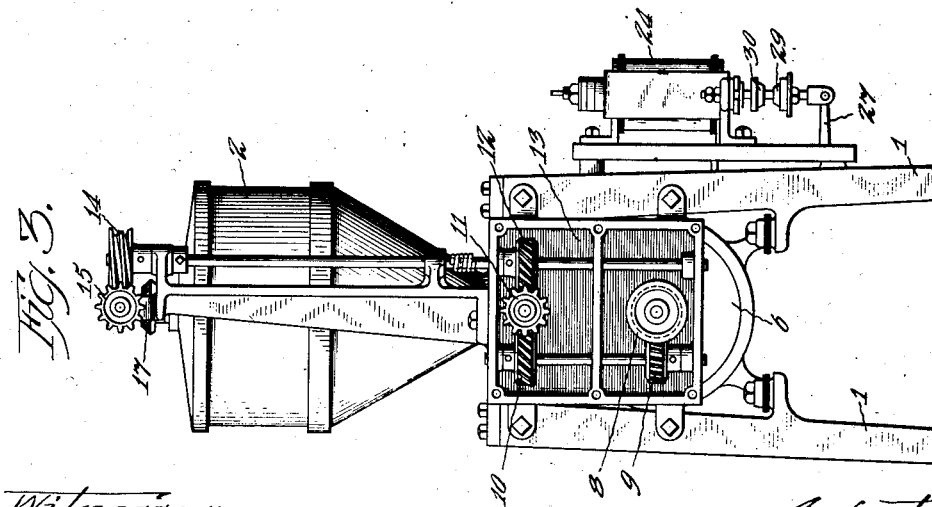

FRANK E. LAYMAN, OF MILWAUKEE, WISCONSIN, ASSIGNOR TO THE CUTLER-HAMMER MFG. CO., OF MILWAUKEE, WISCONSIN, A CORPORATION OF WISCONSIN.

AUTOMATIC WEIGHING DEVICE.

1,260,556.         Specification of Letters Patent.     Patented Mar. 26, 1918.

Application filed April 8, 1912. Serial No. 689,244.

*To all whom it may concern:*

Be it known that I, FRANK E. LAYMAN, a citizen of the United States, residing at Milwaukee, in the county of Milwaukee and State of Wisconsin, have invented new and useful Improvements in Automatic Weighing Devices, of which the following is a full, clear, concise, and exact description, reference being had to the accompanying drawing, forming a part of this specification.

My invention relates to automatic weighing machines.

One of the objects of my invention is to provide an improved weighing machine which is compact in form. Another object is to provide a weighing machine which gives very accurate results even when small amounts of material are weighed. A further object is to provide a weighing machine having means for feeding material onto the scale pan at a more uniform rate than heretofore. An additional object is to provide a weighing machine in which there is an accelerated positive downward movement of the scale pan as soon as the weight of the material thereon overbalances the counterweight, thereby eliminating the oscillations of the scale beam and increasing the rapidity of the weighing operation. Other objects will be apparent from the more detailed description hereinafter given.

In the accompanying drawings I have illustrated a construction which embodies my invention. Other forms may, of course, be devised.

In the drawings:—

Figure 1 is a side elevation of the preferred construction.

Fig. 2 is an end elevation thereof partly in section.

Fig. 3 is an elevation of the side opposite that shown in Fig. 1.

Fig. 4 is a diagrammatic representation of the parts showing the circuit connections for the driving motor.

The machine is provided with a suitable frame or standard 1 which supports the hopper 2 from which the material to be weighed is automatically fed to the weighing scale 3 located adjacent to the base of the standard 1 and preferably independent thereof.

The material is advanced from the hopper to the weighing scale by a suitable screw conveyer 4. This conveyer and the scraper or agitator 5, which provides for a uniform feeding of the material to the conveyer, are driven preferably by an electric motor 6, although I do not limit myself to electrical driving means, as a suitable mechanical drive may, of course, be employed. I prefer to use an electric motor, however, as various auxiliary electrical devices may be conveniently operated from the motor circuit as hereinafter described.

The screw conveyer 4 is mounted so as to rotate in a suitable cylindrical chamber 7 and is driven by the motor through intermediate connections which include the worm and gear 8, 9 and the skew gears 10, 11. See Figs. 3 and 4. These gears and the additional skew gear 12, are suitably mounted in a casing or compartment 13 on the side of the supporting frame 1. The agitator or scraper 5 is also driven by the motor through the same gears just described, and through the additional worm and gear 14, 15 and beveled gears 16, 17.

The hopper is provided with a suitable sliding cover 18 to provide for the introduction of the material to be weighed. The scraper 5, which rotates in close proximity to the conical lower wall of the hopper, provides for a uniform feeding of the material to the screw conveyer. The screw conveyer advances the material to the outlet 19, the lower end of which is normally open but may be closed by a suitable shutter 20 pivoted at 21 and having an arm 22 connected to a suitable spring 23 in such a manner that the opening and closing of the shutter causes said arm to snap back and forth over a dead center, thereby providing for a quick closing of the outlet 19.

The opening and closing of said shutter is effected by a solenoid 24 which, when energized or deënergized, draws up or releases its plunger 25, thereby imparting a throw to the bell crank lever 26 which moves up or down and causes the shutter 20 to snap open or shut. The connections between the plunger 25 and the bell crank lever 26 include an additional bell crank lever 27 and a link 28, the operation of which will be apparent from an inspection of Figs. 1 and 4. The plunger 25 is also provided with a contact member 29 which bridges the stationary contacts 30 when in uppermost position, thereby closing the motor circuit, and which also opens the motor circuit with an abrupt movement when the circuit to the solenoid is opened automatically by the weighing scale as hereinafter described.

The weighing scale, as previously stated, is preferably constructed entirely independent mechanically, of the rest of the apparatus, although I do not limit myself to said independent construction. It comprises preferably the usual elements of a scale, including a scale beam 31 suitably pivoted at the point 32 and carrying at one end the scale pan 33 and at the other end the adjustable counterweight 34. In addition to the usual elements, however, it is provided with an automatic locking device comprising a catch 35 which engages a coöperating catch on the end of a bell rank lever 36. The bell crank lever is normally held with one end resting on a rotatable cam or block 37 by the spring 38. It is apparent that when the weight of the material in the scale pan causes the same to overbalance the counterweight, said scale pan as it lowers will be locked in lower position by the spring catch. By rotating the cam 37, however, the scale pan may be readily released and raised. When the scale pan is in uppermost position or in balanced position the circuit to the solenoid 24 is closed through a suitable switch contact 38 carried on a suitable insulating base 39 which is mounted on the base of the weighing scale 3. An adjustable bail 40 is secured to the scale beam 31 in such a manner as to lift the contact end of the switch contact 38 as soon as the material in the scale pan overbalances the counterweight 34, thereby instantly opening the circuit to the solenoid 24 and simultaneously opening the motor circuit at the contacts 29, 30. Accordingly, the feeding of the material from the hopper ceases instantly when the predetermined weight of material has been deposited on the scale pan and simultaneously the lower end of the outlet 19 is closed by the shutter 20.

It should be noted that the shutter 20 is located at the lower end of the outlet 19. Accordingly, the material falling through the main body portion of the outlet 19 is instantly arrested as soon as the desired weight of material has accumulated on the scale pan. Accordingly, the only excess material which reaches the scale pan after the circuit is opened by the contact 38, is the material which at the time is actually falling through the short distance from the lower end of the outlet 19 to the scale pan. This amount is very small and is quite constant in view of the uniform rate at which the material is being fed from the hopper, so that the error involved is quite small. By virtue of this arrangement a properly constructed scale is capable of weighing uniformly within a small fraction of a gram when weighing only a few grams.

When the scale is in balanced position the material on the scale pan and the adjustable counterweight are both above the point 32 where the scale beam is pivotally supported. Accordingly, it will be apparent that as soon as the material in the scale pan overbalances the counterweight, the scale pan will begin to lower, the downward movement thereof being along the arc of a circle, which is, however, a substantially vertical path. The upward movement of the counterweight is also along the arc of a circle which constitutes, however, an inclined path. The lever arm or the distance measured from the pivot 32 to a vertical line drawn through said counterweight, decreases as the counterweight is raised. Accordingly, the turning moment of the counterweight decreases as it is raised. The turning moment produced by the material in the scale pan, moreover increases as the same descends. As a result the overbalancing effect of the scale pan increases as the pan lowers, giving a positive and accelerated downward movement thereto which insures a quick, positive opening of the circuit by the contact arm 38 and which insures also the interlocking of the spring catch elements. The advantages of the above described positive movement are, first, freedom from oscillation or vibration of the scale beam 31 after the scale has reached a balance, and, second, an increased rapidity in the weighing operation. Without the above arrangement the scale beam 31 might vibrate or oscillate, thereby opening and closing the circuit at the switch member 38 and causing a chattering of the solenoid contact 29, which would subject the motor to a very objectionable series of sudden starts and stops and which would also cause the deposit of additional material on the scale pan.

It is to be understood, of course, that the above apparatus as a whole, and the various arrangements and combinations of elements included therein, have been selected for the purpose of illustration only. Various other devices may be constructed which embody the features of the invention. Accordingly, I do not desire to limit myself to the construction described except where limitations are imposed in the claims, but I desire to cover broadly suitable equivalent means for accomplishing the desired results wherever said means fall within the scope of said claims.

What I claim as new and desire to secure by Letters Patent of the United States is:—

1. A weighing scale comprising a scale beam, a scale pan and a counterweight carried thereby at a substantial elevation above the pivot thereof for providing a accelerated downward movement of said scale pan when the scale overbalances, a circuit contact, and a lost motion connection between said beam and said contact for insuring actuation of the latter to open a circuit only upon accelerated movement of the former.

2. A weighing scale comprising a scale beam, a scale pan and a counter-weight carried thereby at a substantial elevation above the pivot thereof whereby an accelerated downward movement is imparted to said scale pan when the scale overbalances, a switch operating member having an adjustable lost motion connection with said scale beam for actuation thereby to abruptly open a circuit during only the accelerated movement of said beam.

3. A weighing scale comprising a scale beam, a scale pan and a counterweight carried thereby and arranged to insure an accelerated movement of said scale beam following overbalance of said scale, a pivoted switch operating member having an adjustable lost motion connection with said scale beam for abrupt actuation thereby during only the accelerated movement thereof to vary an electric circuit.

4. In an automatic weighing machine, a receptacle for the material to be weighed, a weighing scale, a screw conveyer associated with said receptacle for advancing said material toward the scale pan, a scraper for feeding said material uniformly to said conveyer, a discharged tube through which said material passes from said conveyer to said scale pan, a valve located in the lower end of said discharge tube, a motor for operating said scraper and said conveyer, and a relay controlling the motor circuit and actuating said valve, the circuit of said relay being normally closed by a contact member actuated by a predetermined movement of the scale beam whereby when said scale overbalances due to the accumulation of a predetermined weight of said material onto the scale pan, said relay is deënergized, thereby stopping said motor and closing said valve.

5. A weighing scale comprising a scale beam, a scale pan and a counterweight carried thereby, a switch normally closing a circuit when the scale beam is horizontal but adapted to open said circuit upon a predetermined downward movement of said scale pan, means for increasing the relative value of the turning moment of said scale pan with respect to said counterweight when the scale overbalances whereby an accelerated movement is imparted to said scale beam, thereby opening said circuit with a quick positive movement of the switch contact, and a spring latch for preventing a return movement of said switch contact.

6. In an automatic weighing machine, in combination, a material container, a receiving and weighing scale, a conveying chute therebetween having a power-feed portion adjacent said container and a gravity feed extremity adjacent said scale, power operated feeding means for conveying the material from said container to said extremity of said chute, a valve arranged in said extremity, means for stopping said feeding means and closing said valve when said scale responds to a predetermined weight thereon, and means for effecting the closure of said valve with a snap action.

In witness whereof, I have hereunto subscribed my name in the presence of two witnesses.

FRANK E. LAYMAN.

Witnesses:
FRANK H. HUBBARD,
H. L. ROCKWELL.